United States Patent
Heiberg et al.

[11] Patent Number: 6,047,927
[45] Date of Patent: *Apr. 11, 2000

[54] ESCAPING SINGULARITIES IN A SATELLITE ATTITUDE CONTROL

[75] Inventors: Christopher J. Heiberg, Peoria; David A. Bailey, Glendale, both of Ariz.

[73] Assignee: Honeywell Inc., Minneapolis, Minn.

[ * ] Notice: This patent is subject to a terminal disclaimer.

[21] Appl. No.: 09/039,640

[22] Filed: Mar. 16, 1998

[51] Int. Cl.[7] ....................................... B64G 1/28
[52] U.S. Cl. .......................... 244/165; 244/169; 244/176; 701/13; 701/4; 701/8
[58] Field of Search .................... 244/165, 169, 244/176; 701/13, 4, 8

[56] References Cited

U.S. PATENT DOCUMENTS

| | | | |
|---|---|---|---|
| 5,100,084 | 3/1992 | Rahn et al. | 244/165 |
| 5,248,118 | 9/1993 | Cohen et al. | 244/164 |
| 5,269,483 | 12/1993 | Flament | 244/164 |
| 5,354,016 | 10/1994 | Goodzeit et al. | 244/165 |
| 5,875,676 | 3/1999 | Bailey et al. | 74/5.22 |

Primary Examiner—William A. Cuchlinski, Jr.
Assistant Examiner—Olga Hernandez
Attorney, Agent, or Firm—Robert E. Greenstien

[57] ABSTRACT

Control moment gyros in an array are rotated to reorient a satellite by an attitude signal. If the signal causes a gyro to have position that will produce a singularity in attitude control, a disturbance is introduced into the signal to avoid the singularity.

1 Claim, 3 Drawing Sheets

ESCAPING SINGULARITIES IN A SATELLITE ATTITUDE CONTROL

CROSS REFERENCE TO RELATED APPLICATIONS

This application discloses material discussed in the previously filed application titled Orienting A Satellite With Controlled Momentum Gyros, by David A. Bailey, filed on Sep. 2, 1997, Ser. No. 08,923,742 and these simultaneously filed applications: Robust Singularity Avoidance In A Satellite Attitude Control, by Bong Wie, David A. Bailey and Christopher J. Heiberg, Ser. No. [Docket No. A66 17215]; A Continuous Attitude Control Which Avoids CMG Array Singularities, by David A. Bailey, Christopher J. Heiberg and Bong Wie, Ser. No. [Docket No. A66 17025]; CMG Control Based On Angular Momentum to Control Satellite Attitude, by David A. Bailey Ser. No. [Docket No. A66 17214].

TECHNICAL FIELD OF THE INVENTION

This invention relates to satellites and robotic systems, for example controlling the orientation of a satellite using a plurality of control moment gyros (CMG).

BACKGROUND OF THE INVENTION

The attitude of an agile spacecraft or satellite is often maintained and adjusted with a control moment gyro array because those devices provide high torque and torque amplification. A typical CMG is a rotating mass suspended on a gimbal with an actuator to rotate it on the gimbal axis, producing torque and accumulating angular momentum. Angular momentum is the integral of torque over time. An array of n>3 CMGs is often used, allowing attitude control with some redundancy. Each CMG has an angular momentum (h) constrained essentially to a plane, the angular momentum vector of the gyro is nearly orthogonal to the gimbal axis. The error in orthogonality is small enough that it does not affect the operation of the CMG, the array of CMGs, or the attitude control of the satellite. The wheel speed of the CMG is essentially constant in most applications, but does not have to be for this invention to work. The torque produced by the CMG, Q is the result of the cross product $Q=\dot{\delta} \times h$, where $\dot{\delta}$ is the gimbal rate and h is the angular momentum of the rotor, if varying wheel speed is incorporated then there is an additional term $Q=\dot{\delta} \times h + \dot{h}$, where the angular momentum h is defined as $h=J\Omega$, and $\dot{h}=J\dot{\Omega}$, where J is the moment of inertia of the rotating wheel and $\Omega$ is the rotational rate of the wheel.

Classically the attitude control calculates the desired attitude rates for the satellite $\omega_d$, being the three axis attitude rates. The gimbal angle ($\delta$) rates for the CMG array are calculated using the pseudo inverse control law, $\dot{\delta}=A^T(AA^T)^{-1}J_s\omega_c$, where $J_s$ is the satellite moment of inertia matrix, and A is the Jacobian of CMG array angular momentum with respect to gimbal angle, $$A = \frac{\partial h}{\partial \delta},$$

where h is the sum of the angular momentums of the CMG array, $$h = \sum_{i=1}^{n} h_i.$$

Since the A matrix is a function of the gimbal angles and the gimbal angels change in order to produce torque on the spacecraft the rank of A can drop from 3 to 2, which is a singular condition and the pseudo inverse cannot be calculated.

DISCLOSURE OF THE INVENTION

An object of the present invention is to significantly increase the speed in reorienting a satellite between two objects by utilizing more of the available angular momentum from the CMGs.

According to the present invention, when a gimbal position indicative of a singularity is detected, a disturbance is introduced into the torque command to cause the CMG array to avoid the singularity.

According to the invention, a gimbal rate is generated using $\dot{\delta}=A^*\dot{h}$ where $A^*=A^T[AA^T+kI]^{-1}$, where k is a scalar and I in a 3×3 identity matrix. The value of the determinant $(AA^T)$ is monitored continuously during CMG operation. When the value of $\det(AA^T)$ drops below a preset minimum, the required torque command is altered so as to allow the system to escape the singularity. The torque can be altered by adding a small fixed amount of torque in one or more of the axes, or by selecting a particular orthogonal direction e.g., $$\max\left(\frac{m\dot{h}_c}{\|\dot{h}_c\|_2} \times \begin{bmatrix} 1 \\ 0 \\ 0 \end{bmatrix}, \frac{m\dot{h}_c}{\|\dot{h}_c\|_2} \times \begin{bmatrix} 0 \\ 1 \\ 0 \end{bmatrix}\right),$$

and torque magnitude m, and adding it to the existing torque command. In addition, hysterisis in the implementation of the torque delta eliminates the possibility of limit cycling at the singular point. A deviation in the torque command is perceived as a disturbance to the spacecraft Inertial Measurement Unit (IMU) which subsequently issues updated torque commands to correct for the disturbance.

Other objects, benefits and features of the invention will be apparent from the following discussion of one or more embodiments.

BEST MODE FOR CARRYING OUT THE INVENTION

Figure 1:
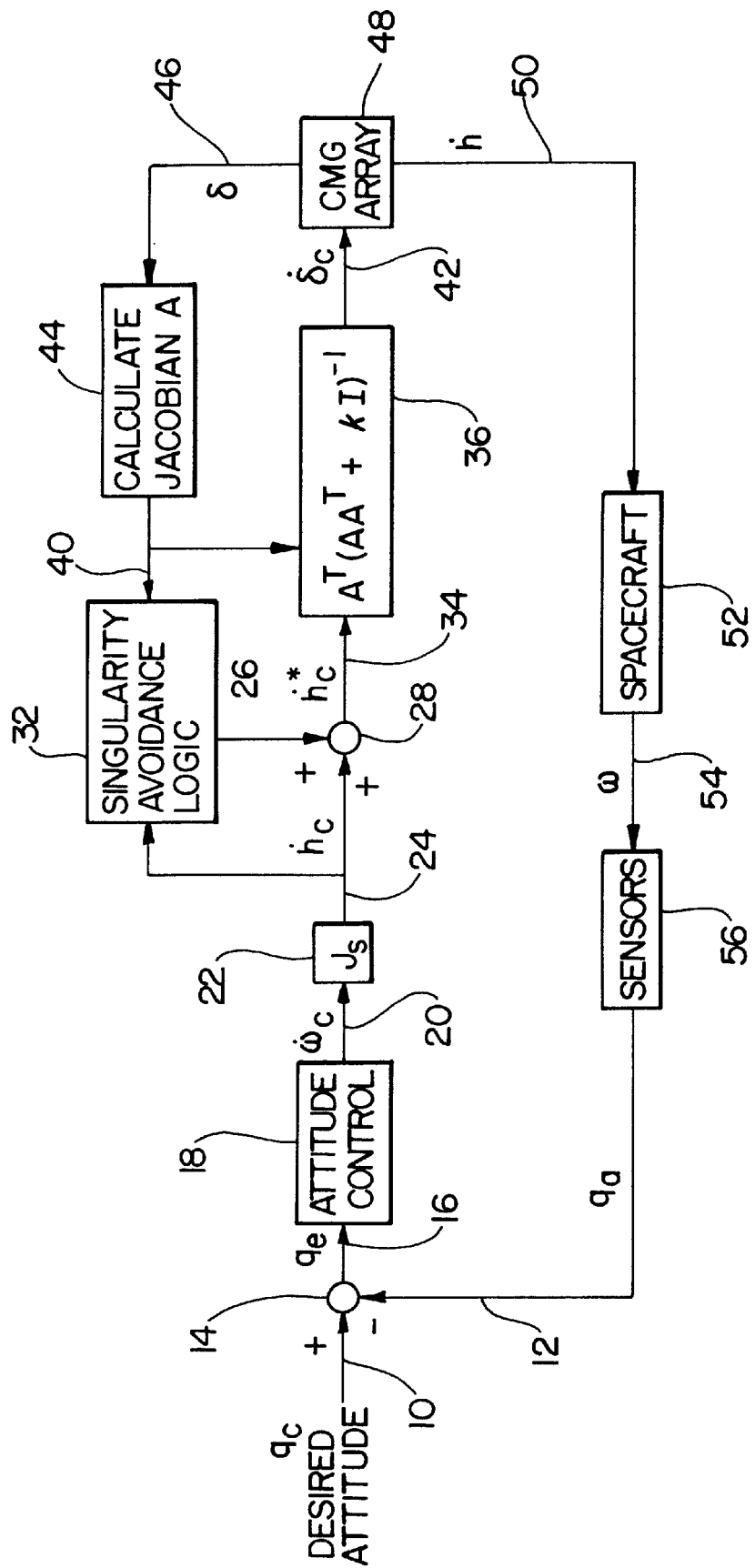
FIG. 1. is a functional block diagram showing a control embodying the present invention to rotate a satellite in response to commanded rotation signal $q_c$.
Figure 2:
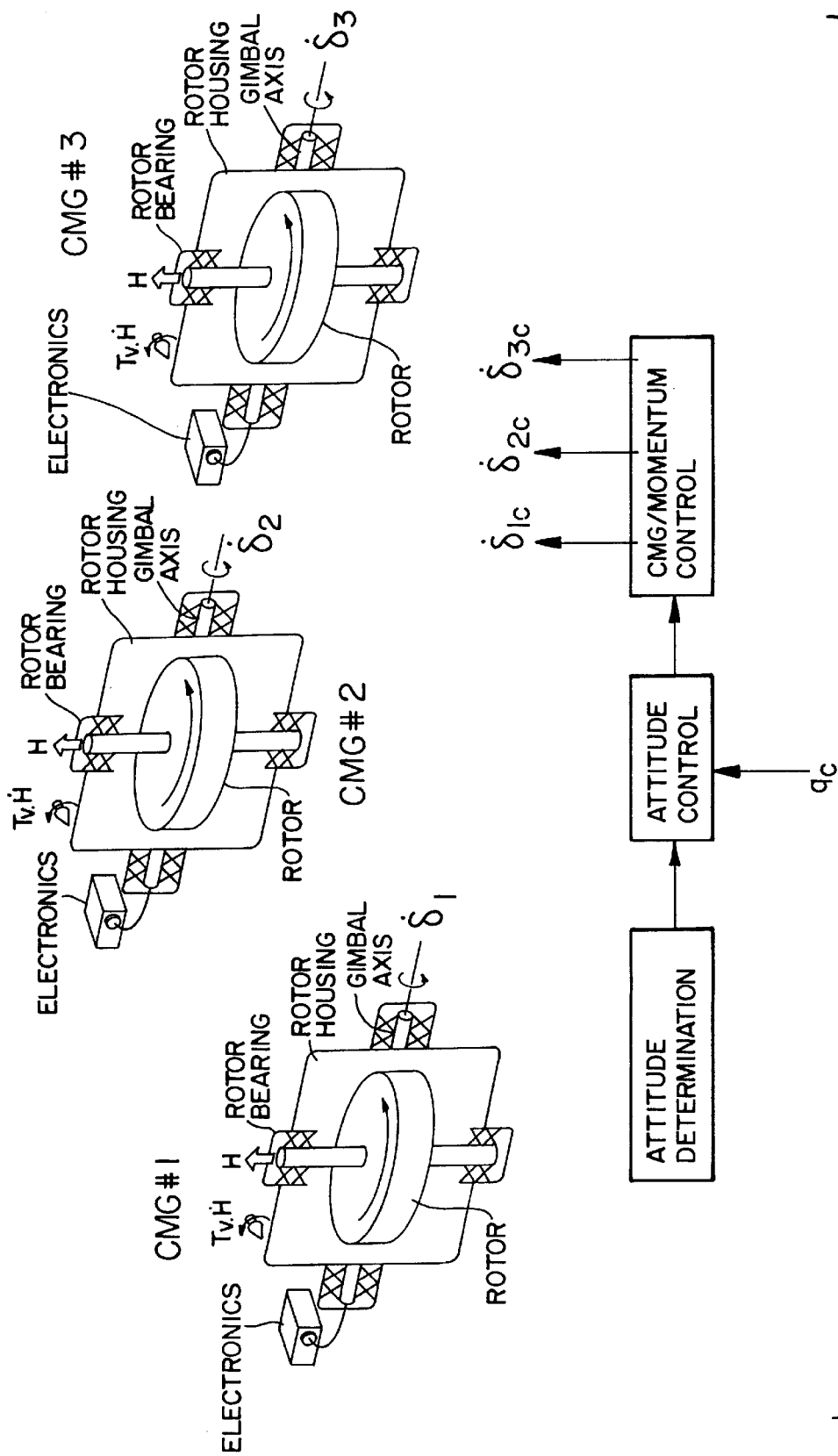
FIG. 2 is a block diagram showing a satellite with CMGs that are rotated to change the satellite's attitude in response to individually produce angular rate signals.
Figure 3:
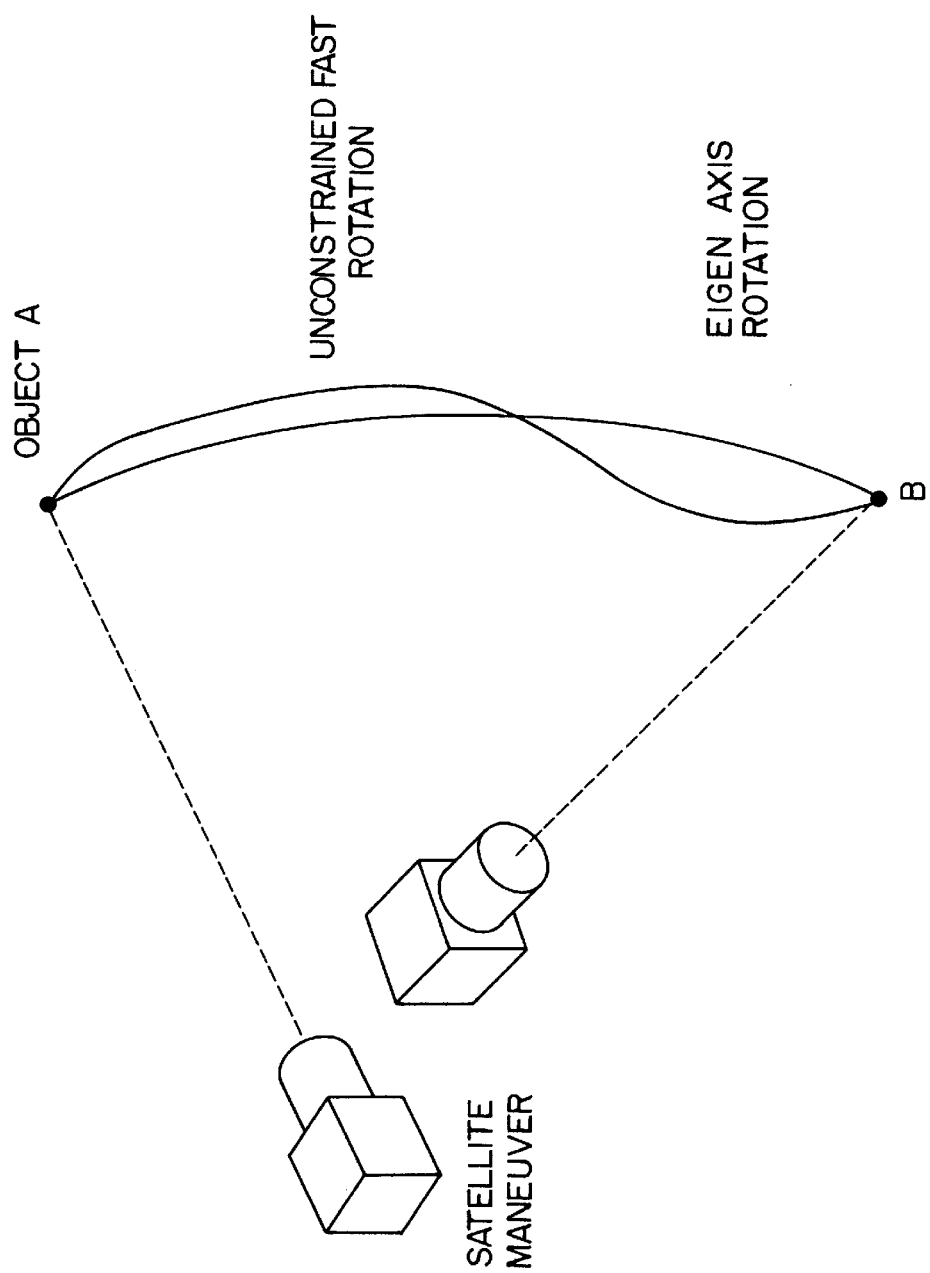
FIG. 3 illustrates two possible paths for reorienting between two objects.

It will be appreciated that FIG. 1 shows function blocks that may be implemented through hardware or software, preferably the latter in a computer based satellite control containing one or more signal processors programmed to produce output signals to control CMGs on the satellite as explained hereafter. Fundamentally the process is shown for a single signal path between two points, but it should be understood that single lines represent vector data which is 3 dimensional for the satellite attitude, attitude rate and torques, and it dimensional for the signals related to the n CMGs. FIG. 2 shows three (n=3) CMGs. The control scheme shown in FIG. 1 is used to pan or rotate the satellite on its axis from the line of sight view of an object A to a line of sight view of object B in FIG. 3. A typical fully closed loop control follows an eigen axis path "old" by controlling the CMG's based on the actual attitude (determined from the attitude determination system ADS in FIG. 3) and desired path attitude.

In FIG. 1, a desired spacecraft attitude 10 is compared with an actual attitude 12, in a summation junction 14. The attitude error 16 from the summing junction 14 is used by the spacecraft attitude controller 18 to produce a desired spacecraft acceleration 20. The desired acceleration 20 is multiplied by the spacecraft inertia matrix 22 to produce a torque command 24. This torque command 24 is applied to a singularity avoidance process 32 along with the values of the Jacobian matrix A 40 where it is decided if a singularity is being encountered and, if a singularity is eminent, a small torque is calculated 26 that enables CMG array singularity escape which is then sent to a summing junction 28. The modified torque command at 34 is sent to the linear transform in box 36 where a modified Moore-Penrose Pseudo-Inverse is utilized to calculate the CMG gimbal angle rate commands 42. The gimbal angle rate commands 42 operate the CMG array 48 which produce torque 50 which acts on the spacecraft 52 to change its rate of rotation 54. The gimbal angles from the array 46 are used to calculate the values of the Jacobian A 40 at step 44 which is used by boxes 32 and 36. The actual rate of spacecraft rotation 54 is measured by sensors 56 which is used to determine the actual spacecraft attitude 12.

The singularity avoidance process 32, in general, a) determines if there is a potential that a singularity will be encountered (i.e., det $(AA^T)$<tolerance), b) if a singularity is likely to be encountered, a small torque that will cause singularity escape is calculated and added to the existing torque command 24 c) otherwise, the torque command is left alone. The additional torque command 26 necessary to escape the singularity is small compared to the command 24 and the vector representing this additional torque 26 cannot be colinear with the existing torque command 24. This process enables the CMG array to be utilized to the maximum available momentum envelope for the given array configuration.

The invention has been explained in the context of a satellite control, but it can be used in systems, such as robotic systems, which can encounter singularities. With the benefit of the previous discussion of the invention, one of ordinary skill in the may be able to modify the invention and the components and functions that have been described in whole or in part without departing from the true scope and spirit of the invention.

We claim:

1. A satellite attitude control comprising a plurality of control moment gyros, an attitude controller comprising signal processing means for providing a gimbal rate signal, for each control moment gyro, to operate an actuator to rotate each control moment gyro to change the attitude of a vehicle from a first attitude to a second attitude in respond to a commanded attitude signal and an inertial measurement unit for providing signals manifesting vehicle rotation, characterized in that:

the signal processing means comprises:
means for producing, for one of said control moment gyros, an error signal manifesting the difference between the commanded attitude and an actual attitude manifested by an attitude control signal, produced by the inertial measurement unit, for producing from said error signal the gimbal rate signal, for producing a singularity signal manifesting that a gimbal position for one of the gyros will produce a singularity in the operation of the plurality of gyros, and for producing a disturbance in the commanded attitude that causes the plurality of gyros to avoid said singularity.

* * * * *